US008726286B2

(12) United States Patent
Gururaja et al.

(10) Patent No.: US 8,726,286 B2
(45) Date of Patent: May 13, 2014

(54) MODELING AND CONSUMING BUSINESS POLICY RULES

(75) Inventors: Ramesh Gururaja, Sammamish, WA (US); Ehab Sobhy, Redmond, WA (US); Arthur Reginald Greef, Burien, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 13/106,862

(22) Filed: May 13, 2011

(65) Prior Publication Data

US 2012/0260253 A1 Oct. 11, 2012

Related U.S. Application Data

(60) Provisional application No. 61/473,500, filed on Apr. 8, 2011.

(51) Int. Cl.
*G06F 9/46* (2006.01)

(52) U.S. Cl.
USPC .......................................... 718/102

(58) Field of Classification Search
None
See application file for complete search history.

(56) References Cited

U.S. PATENT DOCUMENTS

| 7,761,319 | B2 | 7/2010 | Gil et al. |
| 2003/0130931 | A1 | 7/2003 | Mirlas et al. |
| 2006/0190310 | A1 | 8/2006 | Gudla et al. |
| 2006/0277156 | A1 | 12/2006 | Merican |
| 2007/0094199 | A1 | 4/2007 | Deshpande et al. |
| 2008/0082375 | A1 | 4/2008 | Kennis et al. |
| 2008/0320550 | A1 | 12/2008 | Strassner et al. |
| 2009/0063381 | A1 | 3/2009 | Chan et al. |
| 2010/0100468 | A1 | 4/2010 | Spector et al. |
| 2010/0235218 | A1 | 9/2010 | Erhart et al. |

FOREIGN PATENT DOCUMENTS

WO 01-14998 A2 3/2001

OTHER PUBLICATIONS

A, Biz, "Business Rules Management Systems", Retrieved at <<http://www.codeproject.com/KB/work/Business_Rules_Systems.aspx>>, Mar. 17, 2007, pp. 4.
Leite, et al., "Business Rules as Organizational Policies", Retrieved at <<http://www-di.inf.puc-rio.br/~julio/bus-rls.pdf >>, Proceedings of the 9th international workshop on Software specification and design, Apr. 16-18, 1998, pp. 68-76.
"International Search Report", Mailed Date: Oct. 8, 2012, Application No. PCT/US2012/031779, Filed Date: Apr. 2, 2012, pp. 9.

*Primary Examiner* — Gregory A Kessler
(74) *Attorney, Agent, or Firm* — Damon Rieth; Jim Ross; Micky Minhas

(57) ABSTRACT

Concepts and technologies are described herein for modeling and consuming business policy rules. A policy server executes a policy application for modeling and storing the business policy rules. The business policy rules are modeled and stored in a data storage device according to an extensible policy framework architecture that can be tailored by administrators or other entities to support business-specific needs and/or operations. The modeled business policy rules can be used to support enforcement of business policy rules against various business operations, as well as allowing histories and/or other audits of business policy rules to be completed based upon information stored as the business policy rules.

17 Claims, 6 Drawing Sheets

MODELING AND CONSUMING BUSINESS POLICY RULES

CROSS-REFERENCE TO RELATED APPLICATION

This application is related to and claims the benefit of U.S. Provisional Patent Application No. 61/473,500, filed on Apr. 8, 2011, entitled "Modeling and Consuming Business Policy Rules," the entirety of which is hereby incorporated by reference in its entirety.

BACKGROUND

Companies and other organizations sometimes organize themselves using one or more business structures. The business structures can be determined and/or defined based upon the organizations' operations or other factors. For example, some organizations have a financial structure, an operating structure, a purchasing structure, a reporting structure, and other structures to govern various aspects of operations associated with the organization. Processes performed by the organizations can span one or more of these structures, some or each of which can have operating controls and/or policies that are particular to each of the respective structures.

Managing the controls and/or policies of varied structures of an organization can be difficult. In particular, internal controls spanning the structures may be managed manually, making creation or modification of controls difficult and time consuming. Furthermore, tracking changes of the controls over time may be impossible, or even if possible, may require labor-intensive research and/or reconstruction. Similarly, removing or modifying the controls can require manual modification of the controls, creating delays in activation or deactivation of the controls.

It is with respect to these and other considerations that the disclosure made herein is presented.

SUMMARY

Concepts and technologies are described herein for modeling and consuming business policy rules. In accordance with the concepts and technologies disclosed herein, a policy server executes a policy application for modeling and storing the business policy rules. As used herein, a "business policy rule" is a rule, policy, or other control for governing if, how, and/or when functionality associated with particular business processes and/or organizations are or are not allowed to be completed. Thus, business policy rules include information defining organizations subject to control, business processes, actions, or other tasks subject to control, and the types of controls that are imposed on the organizations and/or business processes. The business policy rules disclosed herein also include information defining effective dates and/or termination dates of specific business policy rules, allowing the business policy rules to be made effective on particular dates.

The business policy rules are modeled and stored in a data storage device according to an extensible policy framework architecture. As such, a logical model defining the business policy rules can be tailored by administrators or other entities to support business-specific needs and/or operations. Similarly, the modeled data allows histories or audits of business policy rules to be completed based upon information stored as the business policy rules. Thus, for example, a history defining a number of versions of a business policy rule as well as respective effective dates of the various versions of the business policy rule can be requested and fulfilled based upon the data stored as the business policy rules.

According to one aspect, a policy server executes a policy application that can support interactions for creating and managing business policy rules. The policy application can be configured to present one or more user interfaces for creating or modifying the business policy rules. Additionally, or alternatively, the functionality of the policy application can be accessed via one or more application programming interfaces associated with the policy server. The business policy rules can be generated by or via the policy application and stored at a data storage device associated or in communication with the policy server.

According to another aspect, an application hosted by an application host system is configured to call the policy application. The application calls the policy application via the application programming interfaces and/or by submitting rule requests or other queries to a policy server hosting the policy application. The rule requests are interpretable by the policy application to identify one or more business policy rules associated with an action or transaction associated with the application. The identified business policy rules are provided to the application for enforcement. In some implementations, the application is configured to identify and resolve conflicts between the business policy rules provided to the application.

According to another aspect, an administration application can be accessed to create the business policy rules and/or to perform audits of the business policy rules. The administration application can interact with the policy application and/or a user interface provided by the policy application to create the business policy rules. The administration application also can request an audit of a business policy rule, a request that can be responded to by the policy application with a history of the business policy rule including one or more versions of the business policy rule, effective dates or termination dates of the one or more versions of the business policy rules, other information and the like.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
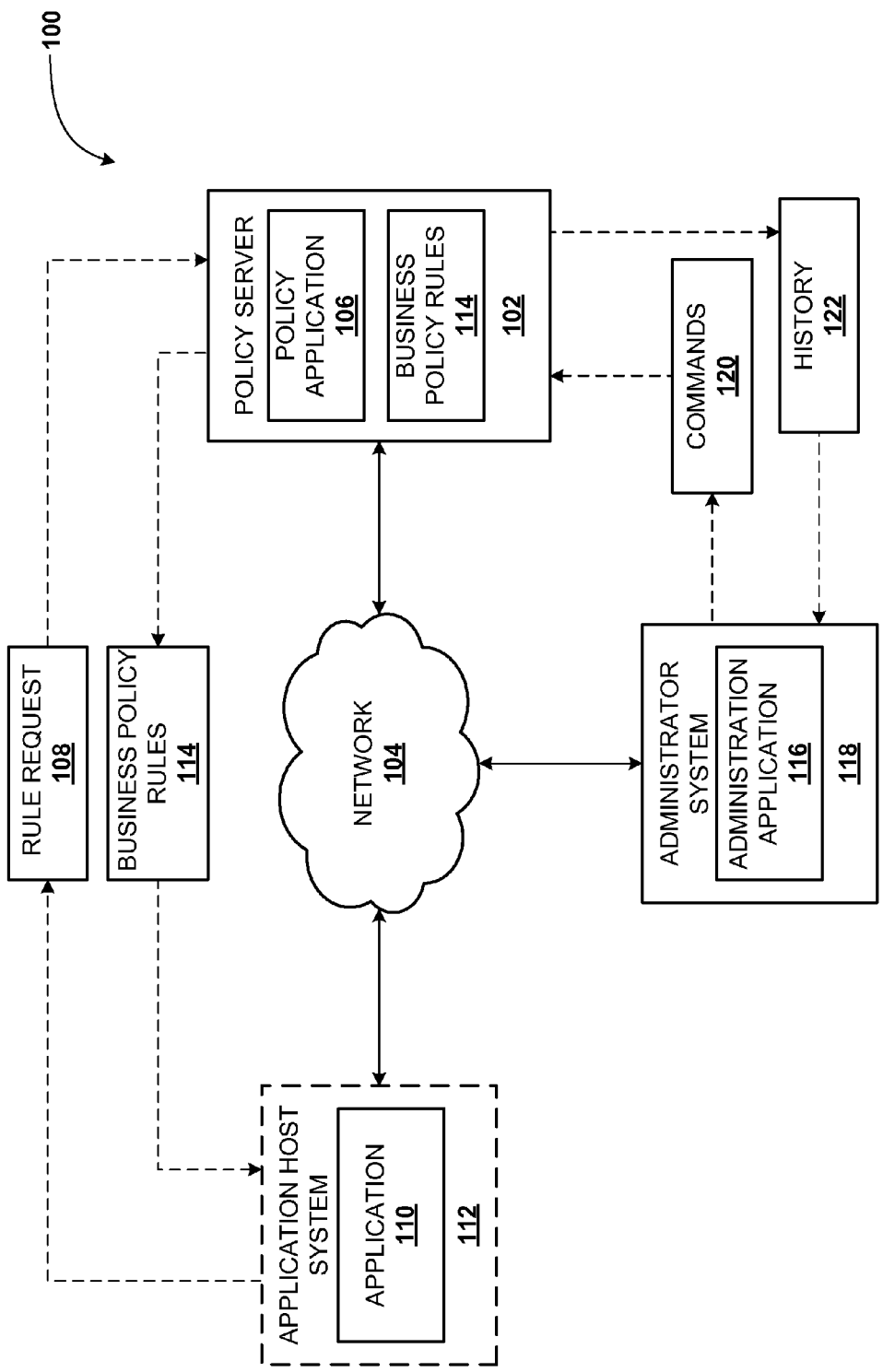
FIG. 1 is a system diagram illustrating an illustrative operating environment for the various embodiments disclosed herein.

The following detailed description is directed to concepts and technologies for modeling and consuming business policy rules. According to the concepts and technologies described herein, a policy server executes a policy application. The policy application can be configured to support various interactions for creating and managing business policy rules via a user interface and/or received commands relating to creation or modification of the business policy rules. The functionality of the policy application also can be accessed via application programming interfaces associated with the policy server and/or submission of commands or requests via an administration application hosted by an administrator system. The business policy rules can be generated by the policy application itself or via the policy application as mentioned above. The generated business policy rules are stored at a data storage device associated with or in communication with the policy server.

One or more applications hosted by one or more application host systems can be configured to call the policy application. The applications can be configured to call the policy application via one or more application programming interfaces and/or by submitting rule requests to the policy application. The rule requests are interpretable by the policy server to identify one or more business policy rules associated with an action or business process occurring or associated with the application. The identified business policy rules are provided to the application, and the application is configured to enforce the identified business policy rules against the actions taken in a business process. If the action in the business process does not comply with the business policy rule, completion of the action in the business process can be denied. Similarly, if the action in the business process complies with the business policy rule, completion of the action can be allowed. In some implementations, the application is configured to identify and resolve conflicts between business policy rules provided to the application according to various rules or settings.

The business policy rules can be created and/or managed via an administration application. Additionally, the administration application is configured to request or perform audits of the business policy rules. The administration application can interact with the policy application and/or a user interface provided by the policy application to create or modify the business policy rules, as well as to request audits of the business policy rules. If the administration application requests an audit of the business policy rules, the policy application can respond with a history of the business policy rule. The history can indicate one or more versions of the business policy rule, effective dates or termination dates of the one or more versions of the business policy rules, other information, and the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for modeling and consuming business policy rules will be presented.

Referring now to FIG. 1, aspects of one operating environment 100 for the various embodiments presented herein will be described. The operating environment 100 shown in FIG. 1 includes a policy server 102 operating on or in communication with a network 104. The policy server 102 is configured to execute an operating system (not illustrated) and one or more application programs such as, for example, a policy application 106 and/or other application programs.

The operating system is a computer program for controlling the operation of the policy server 102. The policy application 106 is an executable programs configured to execute on top of the operating system to provide the functionality described herein for modeling and consuming business policy rules. According to various implementations of the concepts and technologies disclosed herein, the policy application 106 is configured to receive a rule request 108 from an application 110 executed by an application host system 112, to identify one or more business policy rules 114 relating to the rule request 108, and to return the identified business policy rules 114 to the application 110 in response to the request.

The policy application 106 also is configured to support interactions with an administrator or other authorized entities to support creation and management of the business policy rules 114. In the illustrated embodiment, an administrator or other authorized entity interacts with the policy application 106 via an administration application 116 executed by an administrator system 118. The administration application 116 is configured to generate commands 120 for interacting with the policy application 106. The policy application 106 is configured to receive the commands 120, and to create, read, update, or delete the business policy rules 114 in response thereto.

In some embodiments, the policy application 106 further is configured to provide one or more user interfaces ("UIs") to an administrator or other authorized entity. The UIs can be presented at the administrator system 118 via a web browser, stand-alone application, or other application programs. Thus, it should be understood that some or all functionality associated with the administration application 116 can be provided by the policy application 106 executing on the policy server 102. Thus, the functionality of the administration application 116 can be accessed by the administrator or other authorized entity via various application programs. As such, the illustrated embodiment should be understood as being one illustrative example of the concepts and technologies disclosed herein.

Additionally, the commands 120 can be interpreted by the policy application 106 as a request for a business policy rule audit or business policy rule history. In response to a request for a business policy rule audit or history, the policy application 106 is configured to generate a history 122 relating to one or more of the business policy rules 114, and to provide the history 122 to the administration application 116. The history 122 includes data indicating a current version of a business policy rule 114, as well as data indicating past versions of the business policy rule 114, effective dates of the various versions of the business policy rule 114, termination dates of the various versions of the business policy rule 114, and other historical information relating to the business policy rules 114.

The history 122 can be used by the administrator or other authorized entity to conduct an audit of the business policy rules 114 for various purposes. For example, an audit of a business policy rule 114 may be conducted in a situation in which an effective version of the business policy rule 114 on a particular date is in dispute or otherwise of interest. For example, an effective version of a business policy rule 114 on a particular date may be of interest in litigation relating to the business policy rules 114, employee reviews, internal process audits, and the like. The policy application 106 can generate the history 122 based, at least partially, upon effective dates associated with the various versions of the business policy rules 114, and the like.

The business policy rules 114 are illustrated as being stored at a data storage device associated with the policy server 102. It should be understood that this embodiment is illustrative. More particularly, according to various implementations, the policy server 102 includes or is in communication with one or more data storage devices configured to store the business policy rules 114 described herein. In some embodiments, the policy server 102 is coupled to or in communication with a policy datastore or other device. The functionality of a policy datastore can be provided by one or more and/or a combination of data storage devices including, but not limited to, databases, server computers, desktop computers, mobile telephones, laptop computers, memory devices, other computing systems, and the like.

As mentioned above, the rule requests 108 can be received from an application 110 executing on an application host system 112. According to various embodiments, functionality of the application host system 112 is provided by a computing device operating on or in communication with the network 104 and/or in communication with the policy server 102. In some implementations, the functionality of the application host system 112 is provided by a personal computer ("PC") such as a desktop, tablet, or laptop computer system. The functionality of the application host system 112 also can be provided by other types of computing systems including, but not limited to, server computers, handheld computers, netbook computers, embedded computer systems, personal digital assistants, mobile telephones, smart phones, or other computing devices.

The application 110 hosted or executed by the application host system 112 can be configured to provide users, devices, and/or other entities with any desired functionality associated with the application 110. For example, the application 110 can be executed to provide tools for procuring goods and services, customer resource management ("CRM") services, enterprise resource planning ("ERP") services, other functionality, combinations thereof, and the like. As will be explained in more detail herein, the application 110 can be configured to generate the rule requests 108 in response to various operations, actions, and/or business processes such as, for example, a purchase attempt. Thus, it should be understood that the application 110 can be tailored to call the policy application 106 via one or more application programming interfaces ("APIs") associated with the policy server 102 and/or other interfacing mechanisms. It should be understood that this embodiment is illustrative, and should not be construed as being limiting in any way.

FIG. 1 illustrates one policy server 102, one network 104, one application host system 112, and one administrator system 118. It should be understood, however, that some implementations of the operating environment 100 include multiple policy servers 102, multiple networks 104, multiple application host systems 112, and/or multiple administrator systems 118. Thus, the illustrated embodiments should be understood as being illustrative, and should not be construed as being limiting in any way.

Figure 2:
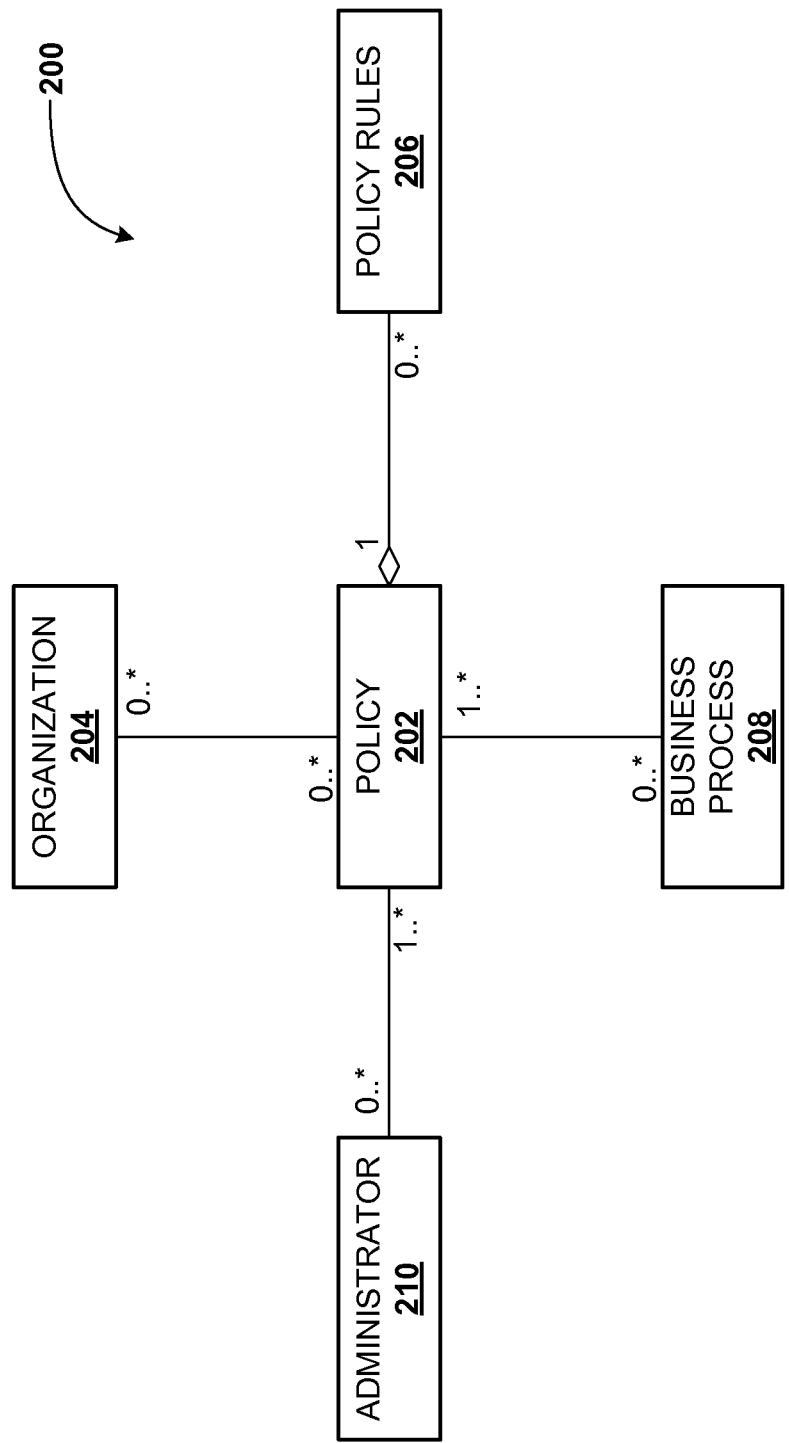
FIG. 2 is a block diagram that schematically illustrates an example policy framework architecture, according to some embodiments.

Turning now to FIG. 2, additional aspects of the business policy rules 114 will be described in detail. In particular, FIG. 2 is a Unified Modeling Language (UML) diagram that schematically illustrates an example of an extendable policy framework architecture 200 for the business policy rules 114, according to some embodiments provided herein. As shown, a policy 202 can be defined for an organization 204. The policy framework architecture 200 can be used to define an association between the policy 202 and the organization 204, such that a number of policies 202 can be defined for a number of organizations 204. This association can indicate a particular organization 204 to which a particular policy 202 applies. As explained above with reference to FIG. 1, this association is indicated in some embodiments by commands 120 received by the policy application 106, though this is not necessarily the case.

Each policy 202 can be defined as a collection of zero or more policy rules 206. In other words, a policy 202 defined for an organization 204 can include none, one, or more than one policy rules 206 relating to the organization 204, wherein each of the policy rules 206 corresponds to an implementation of a specific policy. For example, if an administrator or other authorized entity determines that a particular organization is to be limited to a specific dollar amount for purchases of a particular service, a policy rule 206 can be generated by the administrator or other authorized entity for implementing this policy. Thus, a policy rule 206 can be defined, wherein the organization 204, the dollar amount limitation, and the service to which the dollar amount limitation applies are specified. It should be understood that this embodiment is illustrative, and should not be construed as being limiting in any way.

The policy rules 206 also can be defined as having effective dates, times, and/or time spans. Thus, a particular policy rule 206 may or may not apply at a particular time. Thus, in the above example of a dollar amount limit for a particular service or an organization, the policy rules 206 further can include information indicating when the dollar amount limitations do or do not apply. As such, various policy rules 206 can be defined for the same or a similar activity, wherein the various policy rules 206 can apply to the same or similar activity contemporaneously and/or based upon different effective date information. It should be understood that this embodiment is illustrative, and should not be construed as being limiting in any way.

Additionally, it can be appreciated from FIG. 2 that the policies 202 can be further defined as relating to or controlling zero or more business processes 208. Thus, the policies 202 can be associated with particular business processes 208 such as a procurement or ordering process, a payment process, and the like. Administration of the policies 202 by zero or more administrators 210 also is shown in FIG. 2. As such, each policy 202 can be associated with zero or more administrators 210, and an administrator 210 can be associated with one or more of the policies 202. The identity of the administrator 210 can be determined based upon any desired criteria. For example, the administrator 210 can be determined based upon a job title, seniority, management position, and/or other considerations.

It therefore can be appreciated from the example policy framework architecture 200 illustrated in FIG. 2 that the zero or more business policy rules 114 can be part of one policy 202 that is administered by one or more administrators 210. Each of the policies 202 can control one or more business processes 208 and can apply to zero or more organizations 204. Further, it can be appreciated that each of the policies 202 can include zero or more policy rules 206 that specify particular policies or rules for implementing specific rules or policies. As mentioned above, the business policy rules model is extendable by users, and as such, the illustrated policy framework architecture 200 is illustrative, and should not be construed as being limiting in any way. Furthermore, it should be understood that data defining all of the relationships illustrated in FIG. 2, as well as other data described herein as relating to business rules or policies, can be stored as the business policy rules 114 described herein.

Figure 3:
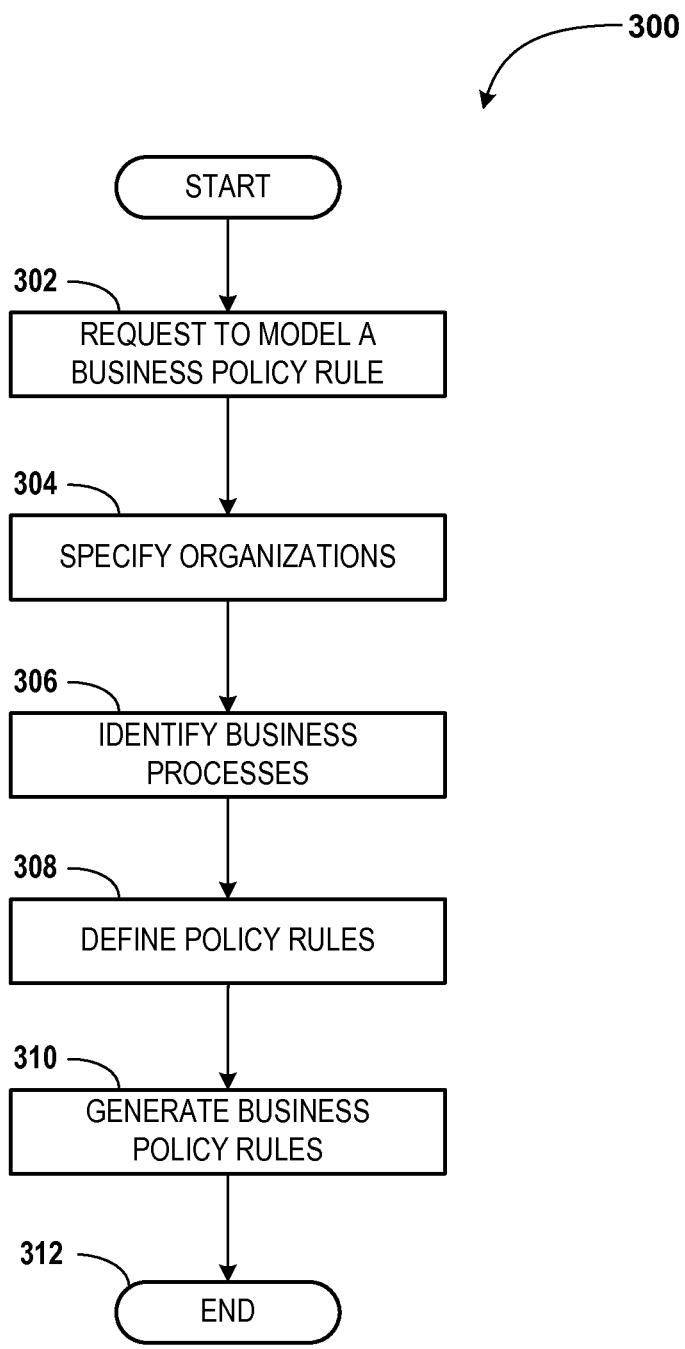
FIG. 3 is a flow diagram showing aspects of a method for modeling the business policy rules, according to an illustrative embodiment.

Turning now to FIG. 3, aspects of a method 300 for modeling the business policy rules 114 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 is described as being performed via interactions with the policy application 106. It should be understood that these embodiments are illustrative, and should not be viewed as being limiting in any way. The method 300 begins at operation 302, wherein the policy application 106 receives a request to generate or modify a model of a business policy that includes business policy rules 114. From the description herein, it can be appreciated that the request received in operation 302 can include a command 120 received from the administrator system 118 or another entity. Additionally, or alternatively, the request received in operation 302 can correspond to selection of a UI control of a UI presented by the policy application 106.

From operation 302, the method 300 proceeds to operation 304, wherein organizations to which the business policy rule 114 apply are specified. In some embodiments, the policy application 106 receives organization data that indicates an organization to which a business policy rule 114 is to apply. A business policy rule 114 can apply to one or more organizations. Similarly, one or more levels, departments, or other entities associated with an organization can be subject to different business policy rules 114. As such, embodiments of the concepts and technologies disclosed herein support controlling different levels of an organization with specific business policy rules 114.

The organization data can be received, for example, via selection or entry of an organization or organization identifier via a command 120 received from an administrator system 118. The organization data also can be received via interactions with a UI presented by the policy application 106. For example, the policy application 106 can generate and/or present a UI that includes a list of organizations from which the organization can be selected to specify the organization in operation 304. The UI additionally or alternatively can include a field for entering data identifying an organization. Thus, operation 304 can include receiving a selection of an organization to which a business policy including business policy rules 114 is to apply, receipt of an identifier, and/or receipt of other organization data that indicates one or more organizations to which a business policy including business policy rules 114 is to apply.

From operation 304, the method 300 proceeds to operation 306, wherein business processes associated with the business policy including the business policy rules 114 are identified. In some embodiments, the policy application 106 receives data indicating the business processes via interactions with a UI presented by the policy application 106. As mentioned above, a "business process" includes, but it not limited to, a particular process, activity, action, application, step, or other function or task associated with an application and/or an organization. For example, as explained above, data identifying business processes associated with the business policy rule 114 can be received or generated via selection of UI controls or data entry into one or more fields for entering data identifying the business processes.

The data received in operation 306 can specify one or more business processes that are associated with the business policy including business policy rules 114. Thus, for example, a user or other entity may specify a purchase processes as being associated with a particular business policy having business policy rules 114. As such, if the policy application 106 is called by a device performing a purchase process, the policy application 106 can retrieve the business policies having business policy rules 114 identified as being associated with the purchase process. It should be understood that this embodiment is illustrative, and should not be construed as being limiting in any way.

From operation 306, the method 300 proceeds to operation 308, wherein the policy rules are defined. In some embodiments, operation 308 includes defining policy rules associated with the organizations specified in operation 304 and/or policy rules associated with the business processes identified in operation 306. According to various implementations, operation 308 includes receiving data that specifies specific controls, policies, and/or other rules including, but not limited to, those described herein with respect to the policy rules 206 of FIG. 2.

Thus, operation 308 includes defining specific controls that are to be implemented by the policy application 106. For example, the controls, policies, and/or rules can include dollar amount limitations that are to be enforced on particular types of purchases or other transactions, access control mechanisms that are to be implemented for particular business processes and/or organizations, and/or other controls, policies, and/or rules. The data received in operation 308 therefore can include specific information that defines the policy rules in a manner that allows or enables enforcement of the policies, rules, and/or controls by the application 110, as will be described in additional detail below with reference to FIG. 4.

The operation 308 also can include receiving or collecting data defining effective dates, termination dates, effective time spans, and/or other time- or date-based information specifying when, from when, until when, and/or for how long the policy rules are to be effective. As explained above with reference to FIG. 1, the effective date data and/or termination date data can be used to determine if a policy rule is effective at a particular time. The effective date information also can be used to generate a history 122 associated with a business policy rule 114, for example, during an audit of a business policy rule 114. The information specifying effective dates, termination dates, and/or other information can be collected or obtained at any point in time during modeling of the business policy rules 114. As such, the illustrated embodiment should be understood as being illustrative.

From operation 308, the method 300 proceeds to operation 310, wherein the policy application 106 generates the business policy rules 114. The policy application 106 is configured, in some embodiments, to generate the business policy rules 114 based, at least partially, upon the data received or collected in operations 304-308. Thus, the policy application 106 can generate the business policy rules 114 based upon the identified organizations, business processes, policy rules, effective dates and/or termination dates, and/or other information obtained or received in operations 304-308. The policy application 106 is configured to model the business policy rules 114 based upon these data and to store the data in a suitable data storage device such as a database, a memory device, and/or other devices, if desired.

Figure 5:
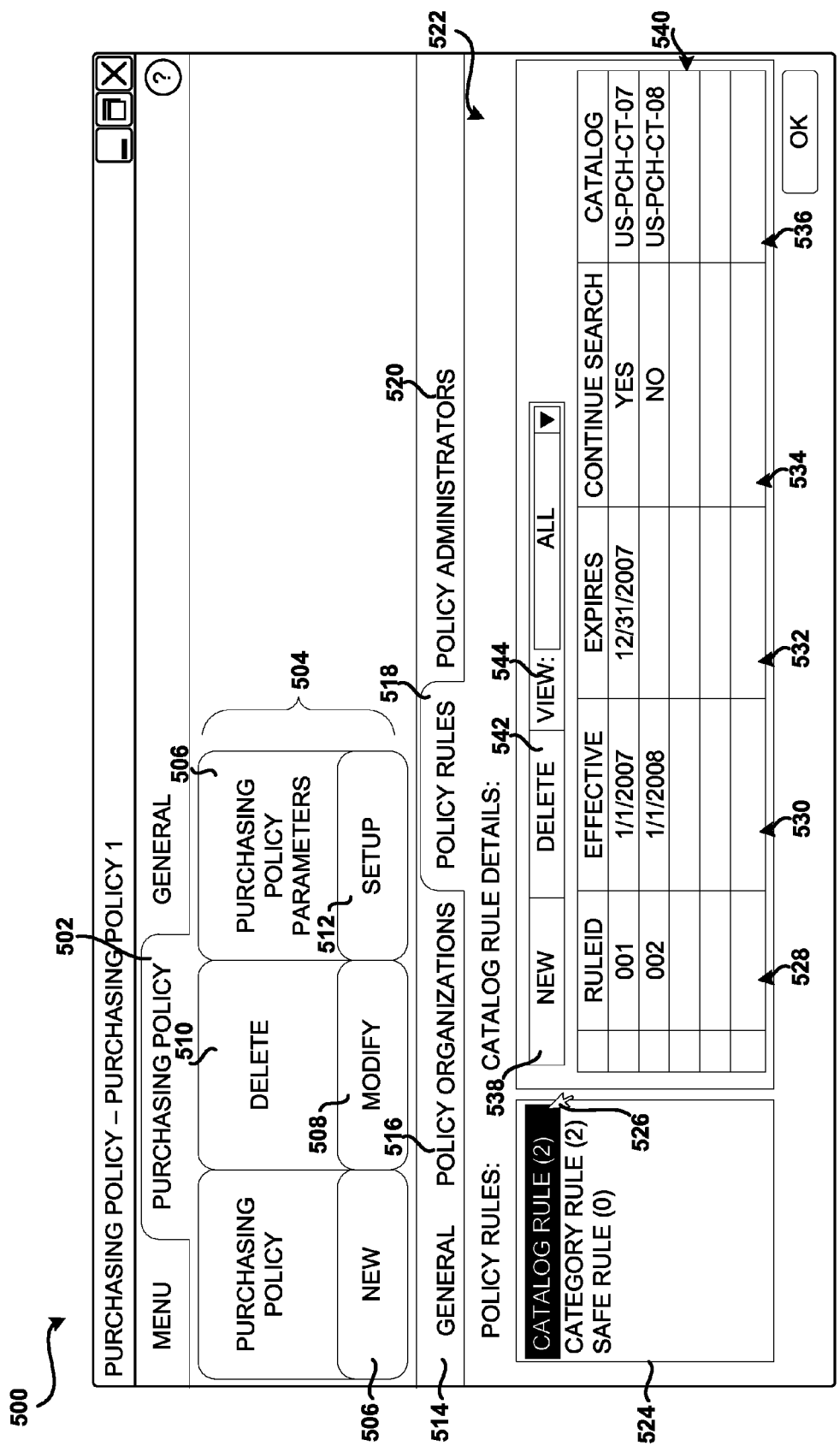
FIG. 5 is a user interface diagram showing aspects of a user interface provided by an administration application for modeling and viewing the business policy rules, according to an illustrative embodiment.

From operation 310, the method 300 proceeds to operation 312. The method 300 ends at operation 312. In some embodiments, the method 300 repeats indefinitely while the business policy rules 114 are modeled. Thus, while not illustrated in FIG. 3, it should be understood that the method 300 can proceed from operation 310 to operation 302. An illustrative user interface ("UI") for modeling the business policy rules 114 is illustrated in FIG. 5.

Figure 4:
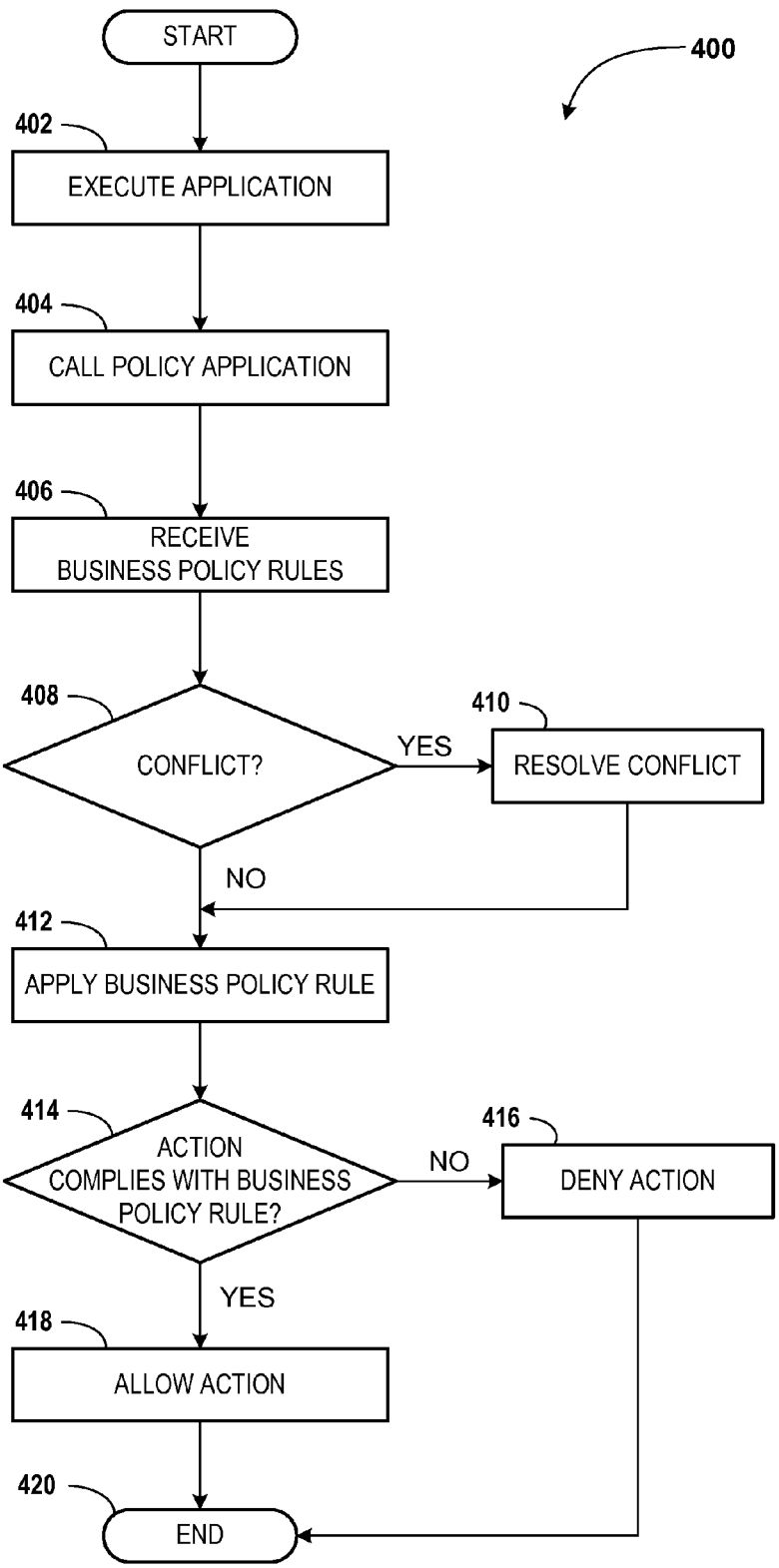
FIG. 4 is a flow diagram showing aspects of a method for consuming the business policy rules, according to an illustrative embodiment.

Turning now to FIG. 4, aspects of a method 400 for consuming the business policy rules 114 are described in detail. For purposes of illustration, and not limitation, the method 400 is described as being performed by the application 110. It should be understood that this embodiment is illustrative, and should not be construed as being limiting in any way. The method 400 begins at operation 402, wherein the application 110 is executed. In some embodiments, the application 110 is executed by an application host system 112, though in some embodiments, the application 110 can be executed by more than one device. As such, the embodiment illustrated in FIG. 1 should be understood as being illustrative, and should not be construed as being limiting in any way.

From operation 402, the method 400 proceeds to operation 404, wherein the application 110 calls the policy application 106. Although not shown in FIG. 4, it should be appreciated that operation 404 can include generation and/or submission of a rule request 108 or other request for one or more business policy rules 114. The application 110 can be configured to generate the rule requests 108 and to submit the rule requests 108 to the policy application 106.

More particularly, as explained herein, the application 110 can be authored or tailored to call the policy application 106. In some instances, the application 110 is tailored to call the policy application 106 during execution of functionality associated with a particular function, action, business process, instruction, and the like. For example, if the application 110 corresponds to a procurement application or system, the application 110 can be configured to call the policy application 106 if a particular type of transaction or action is attempted or completed. It should be understood that this embodiment is illustrative, and should not be construed as being limiting in any way. It also should be understood that a particular application 110 may be configured to call the policy application 106 multiple times during execution of a particular business process.

From operation 404, the method 400 proceeds to operation 406, wherein the application 110 receives the business policy rules 114 in response to the call described above with reference to operation 404. Although not shown in FIG. 4, it should be appreciated that the business policy rules 114 relevant to the call described herein can be identified and provided by the policy server 102 in response to the rule request 108 and/or other request generated by or obtained from the application 110. As such, it should be understood that the rule request 108 can specify a business process or instruction being executed by the application 110, an organization associated with the application 110, and/or other information that may be used by the policy server 102 to identify one or more relevant business policy rules 114. Furthermore, the rule request 108 can specify an effective date or a current time or date that may be used to further identify the business policy rules 114. In operation 406, the application 110 can receive zero, one, or more than one business policy rules 114, depending upon what data is stored as the business policy rules 114.

From operation 406, the method 400 proceeds to operation 408, wherein the application 110 determines if there is a conflict among the business policy rules 114 received in operation 406. In some instances, zero or only one business policy rule 114 is received in operation 406. For example, the policy application 106 may identify no business policy rules 114 or one business policy rule 114 as being relevant to the business process or instruction being performed by the application 110. As such, the application 110 can determine that no conflict exists among the received business policy rules 114.

In some instances, the application 110 can receive multiple business policy rules 114 in operation 406. As such, the application 110 may determine that multiple business policy rules 114 are relevant to the business process or instruction being performed by the application 110. In these and other instances, the application 110 may determine that a conflict among the business policy rules 114 exists.

If the application 110 determines, in operation 408, that a conflict exists, the method 400 proceeds to operation 410 wherein the application 110 resolves the conflict between the business policy rules 114. In particular, the application 110 can be configured with instructions defining how conflicts among the business policy rules 114 are to be resolved by the application 110. For example, the application 110 can be configured to resolve conflicts between business policy rules 114 by using the business policy rule 114 with the most recent effective date. In another example, the application 110 is configured to resolve conflicts between business policy rules 114 by using the business policy rule 114 configured by an administrator or other authorized entity with the most seniority or authority. In yet another example, the application 110 can be configured to resolve conflicts between business policy rules 114 by using the business policy rule 114 with the most restrictive policies under the assumption that a more restrictive policy will satisfy all versions of the business policy rules 114. Other methods for resolving conflicts are possible and are contemplated. As will be appreciated from the above description, operation 410 can include identifying a business policy rule 114 identified during the conflict resolution process.

If the application 110 determines in operation 408 that a conflict does not exist, and from operation 410, the method 400 proceeds to operation 412. In operation 412, the application 110 applies the business policy rule 114. As explained above, the business policy rule 114 applied in operation 412 can be a single business policy rule 114 received in operation 406 if no conflict existed, or a business policy rule 114 identified in operation 410 using the conflict resolution process described above.

From operation 412, the method 400 proceeds to operation 414, wherein the application 110 determines if the business process, instruction, or other action that prompted calling of the policy application 106 complies with the business policy rule 114. If the application 110 determines in operation 414 that the action does not comply with the business policy rule 114, the method 400 proceeds to operation 416, wherein the application 110 denies completion of the action. If the application 110 determines in operation 414 that the action complies with the business policy rule 114, the method 400 proceeds to operation 418, wherein the application 110 allows the action to be completed.

From operations 416 and 418, the method 400 proceeds to operation 420. The method 400 ends at operation 420.

Turning now to FIG. 5, additional aspects of modeling and consuming business policy rules 114 will be described in detail. In particular, FIG. 5 illustrates a screen display 500 generated by the administration application 116 for providing a user interface for modeling and viewing the business policy rules 114, according to an illustrative embodiment. As shown, the screen display 500 includes various menu options for accessing functionality provided by the administrative application 116. In the illustrated embodiment, a UI control 502 for displaying, creating, modifying, and deleting purchasing policy rules has been selected, thereby displaying a purchasing policy menu 504. It should be understood that this embodiment is illustrative, and should not be construed as being limiting in any way. In particular, it should be understood that the user interface illustrated in FIG. 5 can be used to create any type of business policy rules 104, and is not limited to creating and/or managing purchasing policy rules.

The purchasing policy menu 504 includes a number of UI controls including a UI control 506 for creating a new purchasing policy or other collection of purchasing policy rules, a UI control 508 for modifying a purchasing policy or other collection of purchasing policy rules, a UI control 510 for deleting a purchasing policy or other collection of purchasing policy rules, a UI control 512 for setting up a purchasing policy or other collection of purchasing policy rules, other controls, combinations thereof, and the like. The screen display 500 also includes additional controls for accessing details associated with the purchasing policy. In the illustrated embodiment, the screen display 500 includes a UI control 514 for accessing a general properties tab for defining the purchasing policy or other policy in additional detail, a UI control 516 for accessing a policy organizations tab for defining policy organizations associated with the purchasing policy, a UI control 518 for accessing a policy rules tab for modeling, modifying, deleting, and/or viewing policy rules associated with the purchasing policy, and a UI control 520 for accessing a policy administrators tab for specifying one or more parties who can function as administrators with respect to the purchasing policy. In the illustrated embodiment, the policy rules tab 522 is displayed in response to a user selecting the UI control 518. It should be understood that this embodiment is illustrative, and should not be construed as being limiting in any way.

The policy rules tab 522 presents a user interface for viewing, deleting, modifying, and creating ("modeling") the business policy rules 114, corresponding in the illustrated example to purchasing policy rules. The policy rules tab 522 includes a UI control 524 for selecting a type or category of business policy rules 114. In the illustrated example, the "catalog rule" category has been selected by clicking on, hovering over, and/or otherwise indicating selection of the text indicating "catalog rule (2)," indicating that two rules are stored in that category, as indicated by the mouse pointer 526. It should be understood that this embodiment is illustrative, and should not be construed as being limiting in any way.

In response to selection of the catalog rule option, the policy rules tab 522 displays a catalog rules detail display for viewing, creating, updating, and/or deleting the business policy rules 114 categorized as catalog rules. As shown in FIG. 5, the catalog rules detail displays two business policy rules 114 stored by the policy server 102 and information stored with respect to the business policy rules 114. In the illustrated example, the catalog rules detail displays a ruleID column 528, an effective data column 530 for displaying an effective date for the business policy rules 114, an expires column 532 for displaying the expiration date of the business policy rules 114, a continue search column 534 for specifying if a continue search option is enabled or disabled at the policy rule type level, and a catalog column 536 for specifying a catalog to which the business policy rules 114 relate. It should be understood that this embodiment is illustrative, and should not be construed as being limiting in any way.

As shown in the example illustrated in FIG. 5 and as explained herein, an administrator or other authorized entity can specify an effective date for each of the business policy rules 114, as well as an expiration date, if desired. As such, some of the business policy rules 114 can be enforced beginning on a specified date and/or enforcement of the business policy rules 114 can be terminated on a specified date. The ruleID for the business policy rules 114 can be automatically assigned upon creation or generated by a user by interfacing with the administration application 116. Values for each of the business policy rules 114 displayed in the catalog rules detail can be edited in place by selecting a field, column, or row of the catalog rules detail, if desired. As such, a user can modify the business policy rules 114 via the user interface illustrated in FIG. 5, if desired. Thus, it can be appreciated that embodiments of the concepts and technologies disclosed herein support easy creation and management of the business policy rules 114, as well as date-effecting and modification of the business policy rules 114.

The user interface illustrated in FIG. 5 also includes a UI control 538 for creating a business policy rule 114 in the catalog rule category. In response to selection of the UI control 538, the administration application 116 can present rule creation window (not illustrated) or create a new rule in the displayed grid 540 for creating the new business policy rule 114. The user interface also includes a UI control 542 for deleting a selected business policy rule 114 and a UI control 544 for restricting or expanding the types of rules viewable in the grid 540. It should be understood that the illustrated embodiment is illustrative, and should not be construed as being limiting in any way.

Figure 6:
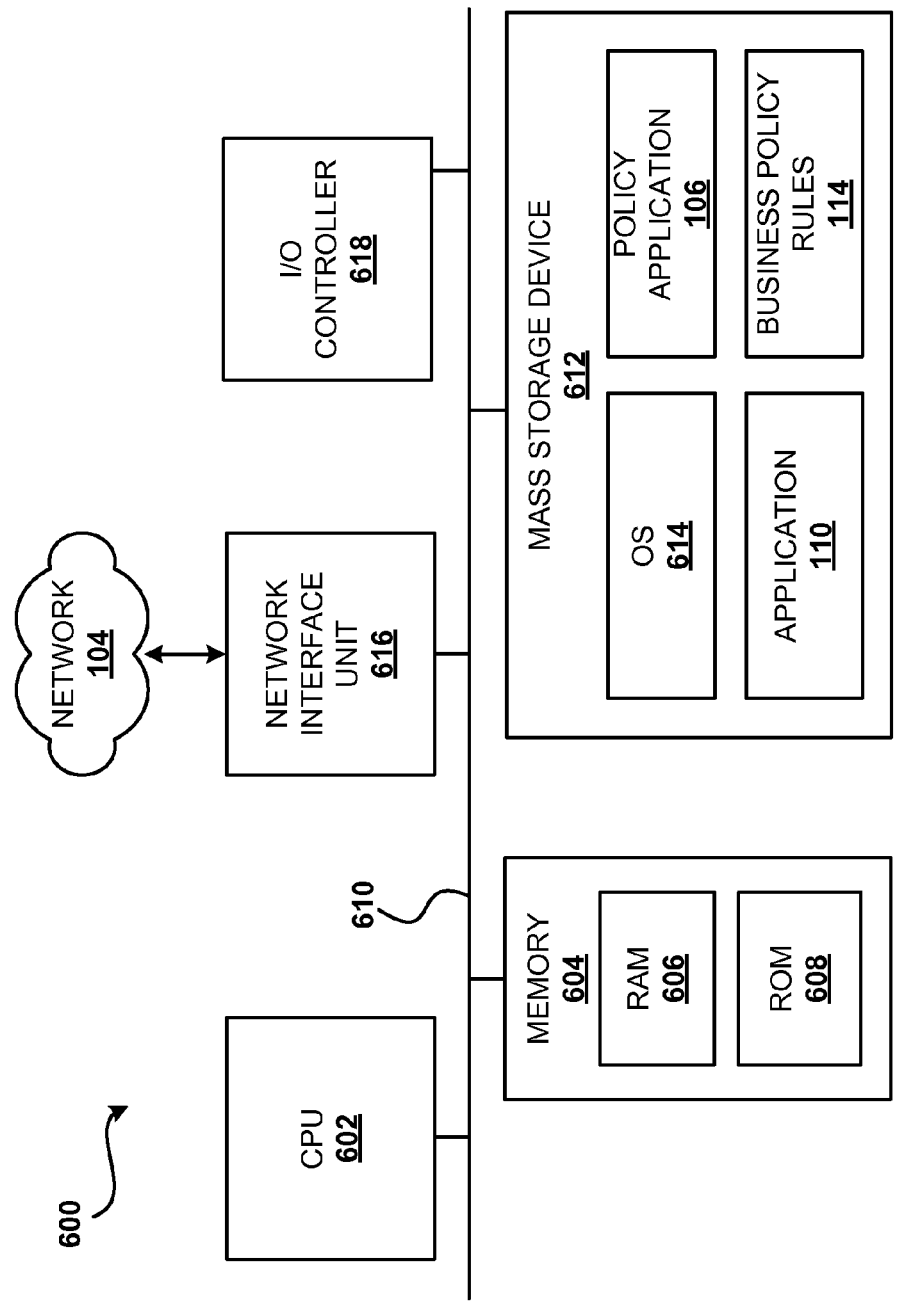
FIG. 6 is a computer architecture diagram illustrating an illustrative computer hardware and software architecture for a computing system capable of implementing aspects of the embodiments presented herein.

FIG. 6 illustrates an illustrative computer architecture 600 for a device capable of executing the software components described herein for modeling and consuming business policy rules. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 614 and the application 110, the policy application 106, and/or the business policy rules 114. Although not shown in FIG. 6, the mass storage device 612 also can be configured to store the administration application 116, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data.

For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium" and variations thereof, does not include waves, signals, and/or other transitory and/or intangible communication media, per se.

According to various embodiments, the computer architecture 600 may operate in a networked environment using logical connections to remote computers through a network such as the network 104. The computer architecture 600 may connect to the network 104 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for modeling and consuming business policy rules have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for consuming business policy rules, the computer-implemented method comprising performing computer-implemented operations for:
   generating the business policy rules by way of an administrator system in communication with a policy application by presenting a user interface for
      specifying an organization to which a business policy comprising business policy rules is to apply,
      identifying a business process associated with the business policy comprising business policy rules,
      defining policy rules associated with the business policy, the policy rules comprising data defining a rule to be applied to the business process, and
      generating a business policy rule based, at least partially, upon the specified organization, the business process, and the policy rules;
   calling, during execution of a client application, the policy application to identify the business policy rules;
   receiving, by way of the client application, the business policy rules, in response to calling the policy application;
   determining if a conflict exists among the received business policy rules;
   resolving the conflict, in response to determining that the conflict exists among the received business policy rules;
   applying, by way of the client application, at least one business policy rule of the business policy rules to an action associated with execution of the application; and
   determining if the action associated with execution of the application complies with the at least one business policy rule.

2. The method of claim 1, further comprising denying completion of the action, in response to determining that the action associated with execution of the application does not comply with the at least one business policy rule.

3. The method of claim 1, further comprising allowing completion of the action, in response to determining that the action associated with execution of the application does comply with the at least one business policy rule.

4. The method of claim 1, wherein determining if the conflict exists among the received business policy rules further comprises:
   determining that the conflict exists among the received business policy rules in response to determining that the received business policy rules include more than one business policy rule; and
   determining that the conflict does not exist among the received business policy rules in response to determining that the received business policy rules include one business policy rule.

5. The method of claim 1, wherein defining the policy rules further comprises defining effective date information associated with the business policy rules.

6. The method of claim 5, wherein the effective date information comprises data defining at least one of an effective date, a termination date, or a time during which the business policy rule is to be effective.

7. The method of claim 1, further comprising generating a request for a business policy rule audit.

8. The method of claim 7, further comprising receiving, in response to the request, a history associated with the business policy rule, the history comprising data defining at least one version of the business policy rule and at least one effective date associated with the at least one version.

9. A computer-implemented method for consuming business policy rules, the computer-implemented method comprising performing computer-implemented operations for:
   generating a plurality of business policy rules by presenting a user interface for
      specifying an organization to which a business policy rule is to apply,
      identifying a business process associated with the business policy rule, the business process comprising an action associated with execution of an application,
      defining policy rules associated with the business policy rule, the policy rules comprising data defining a rule to be applied to the business process and effective date information associated with the business policy rule, and
      generating the business policy rule based, at least partially, upon the specified organization, the business process, and the policy rules;
   calling, during execution of the application, a policy application to identify the plurality of business policy rules;
   receiving the plurality of business policy rules, in response to calling the policy application, the plurality of business policy rules identified by the policy application as being related to the action;
   determining if a conflict exists among the plurality of business policy rules;
   resolving the conflict, in response to determining that the conflict exists among the plurality of business policy rules;

applying at least one business policy rule of the plurality of business policy rules to the action, the at least one business policy rule being determined during resolution of the conflict; and determining if the action complies with the at least one business policy rule.

10. The method of claim 9, further comprising:

denying completion of the action, in response to determining that the action associated with execution of the application does not comply with the at least one business policy rule; and allowing completion of the action, in response to determining that the action associated with execution of the application does comply with the at least one business policy rule.

11. The method of claim 9, wherein resolving the conflict comprises identifying the at least one business policy rule based, at least partially, upon respective effective dates associated with the plurality of business policy rules.

12. The method of claim 9, wherein resolving the conflict comprises identifying an entity associated with the plurality of business policy rules and selecting, based upon the identified entity, one of the plurality of business policy rules.

13. The method of claim 9, wherein resolving the conflict comprises:

identifying policies associated with each of the plurality of business policy rules; and selecting the at least one business policy rule based, at least partially, upon identifying a most restrictive business policy rule of the plurality of business policy rules.

14. The method of claim 9, wherein the effective date information comprises data defining at least one of an effective date, a termination date, or a time during which the business policy rule is to be effective.

15. A computer storage medium having computer-readable instructions stored thereupon that, when executed by a computer, cause the computer to:

receive organization data via a user interface, the organization data specifying an organization to which a business policy rule is to apply;

receive business process data via the user interface, the business process data identifying a business process associated with the business policy rule;

receive policy data via the user interface, the policy data defining a rule to be applied to the business process and effective date information associated with the business policy rule; and generate the business policy rule based, at least partially, upon the received organization data, the business process data, and the policy data.

16. The computer storage medium of claim 15, further comprising computer executable instructions that, when executed by the computer, cause the computer to:

store the business policy rules at a data storage location accessible by a policy server;

receive a call from an application, the call requesting identification of business policy rules associated with execution of the application;

retrieve the business policy rules in response to the call; and provide the business policy rules to the application.

17. The computer storage medium of claim 16, wherein providing the business policy rules to the application comprises providing the business policy rules to an application configured to:

determine if a conflict exists among the plurality of business policy rules;

resolve the conflict, in response to determining that the conflict exists among the received plurality of business policy rules;

apply at least one business policy rule of the plurality of business policy rules, the at least one business policy rule being determined during resolution of the conflict; and determine if the action complies with the at least one business policy rule.

* * * * *